United States Patent [19]

Schindler

[11] Patent Number: 4,810,504
[45] Date of Patent: Mar. 7, 1989

[54] METHOD OF PRODUCING A MUSHROOM AROMA IN MUSHROOM CELL MASSES

[75] Inventor: Fritz Schindler, Gelsenkirchen, Fed. Rep. of Germany

[73] Assignee: Hüls Aktiengesellschaft, Marl, Fed. Rep. of Germany

[21] Appl. No.: 145,961

[22] Filed: Jan. 20, 1988

[30] Foreign Application Priority Data

Mar. 19, 1987 [DE] Fed. Rep. of Germany ....... 3708932

[51] Int. Cl.$^4$ .............................................. A23L 1/28
[52] U.S. Cl. ........................................ 426/7; 426/52; 426/650; 426/655; 47/1.1
[58] Field of Search ................... 47/1.1; 426/7, 49, 52, 426/650, 651, 655, 534, 541

[56] References Cited

U.S. PATENT DOCUMENTS 2,761,246  9/1956  Szuecs .................................... 47/1.1
2,850,841  9/1958  Szuecs .................................... 426/7

FOREIGN PATENT DOCUMENTS 1061674  11/1974  Japan ..................................... 426/7

OTHER PUBLICATIONS

*J. Agric. Food Chem.* (1982), vol. 30, pp. 89–93, "Formation of Eight–Carbon and Ten–Carbon Components in Mushrooms (Agaricus Campestris);" Roland Tressl et al.

*Technologie der Pilzverarbeitung,* (1974), pp. 155–157, "Pilzextrakte, Pilzkonzentrate, Pilztrockenkonzentrate"; Verarbeitung der Frischpilze.

*Z. Lebensm.–Unters. U.–Forsch.* (1983), pp. 16–19, "Bestimmung von 1-Octen-3-Ol in Pilzen und Pilzprodukten"; Margot Wurzenberger und Werner Grosch.

*Food Processing,* (Sep. 1963), pp. 99–101, "Real Mushrooms in Powder Form"; John B. Klis.

*Folia Microbio.* (1973), vol. 18, pp. 277–280, "Dedikaryotization of Higher Fungi in Submerged Culture"; A. Ginterova.

*Primary Examiner*—Marianne Cintins
*Attorney, Agent, or Firm*—Oblon, Fisher, Spivak, McClelland & Maier

[57] ABSTRACT

A method of producing a mushroom aroma in mushroom cell masses. Heretofore, mushroom aromas have been produced nearly exclusively by using dried mushrooms or extracts from mushroom apothecia. Products from fermentatively cultured mushroom mycelium have thus far contained very little 1-octen-3-ol. According to the invention, fermentative cultured mushroom mycelium is mechanically treated in the presence of air, followed by contentration by known methods. Mushroom aromas are obtained in mushroom cell masses with high 1-octen-3-ol content, making the masses suitable for use in mushroom soups or mushroom sauces.

14 Claims, No Drawings

METHOD OF PRODUCING A MUSHROOM AROMA IN MUSHROOM CELL MASSES

BACKGROUND OF THE INVENTION

1. Field of the Invention

The invention relates to a method of producing a mushroom aroma in mushroom cell masses from fermentatively cultured edible mushrooms. The cell masses are distinguished by having a high content of 1-octen-3-ol.

2. Discussion of the Background

1-Octen-3-ol is the essential aroma component which gives the edible mushrooms their typical mushroom taste. Chemical methods produce this compound as a racemate. The natural product having the intensive mushroom taste is, however, solely the levorotary enantiomer (1982 *J. Agr. Food Chem.*, 30, 89–93).

There is a high demand in the food industry for a natural mushroom aroma, for use in preparing, for example, finished soups and sauces. Currently this demand is met chiefly by dried or ground mushrooms. Mushroom extracts and concentrates, which are also used, are prepared almost exclusively from collected forest mushrooms or from cultured mushrooms, e.g. champignons. According to Boetticher, 1974, "Technologie der Pilzverarbeitung", pp. 155–7, these products are comprised of more or less concentrated pressed juices from mushroom apothecia.

1-Octen-3-ol in cultured champignons was determined quantitatively by Wurzenberger, M., and Grosch, W., 1983, *Z. Lebensm.-Unters. u. -Forsch.*, 16–19. According to this report, the 1-octen-3-ol is primarily present in the lamellae, and to a lesser extent in the stem. For the analytical determination of 1-octen-3-ol, the champignons were peeled, thoroughly chopped, and then extracted with pentane. The production of a mushroom aroma was not described.

U.S. Pat. No. 2,761,246 describes the fermentative culturing of edible mushrooms, with 3 stages of fermentation. At the end of the first stage care must be taken to ensure good distribution of the mycelium. Accordingly, pellets of mycelium are broken up with a microhomogenizer before the next substrate batch can be inoculated with the product. There is no production of mushroom aroma in the mushroom cell masses.

According to Klis, J. B., 1963, *Food Processing*, 99–101, mushroom aromas can be prepared from fermentatively cultured edible mushrooms. These products have a low content of 1-octen-3-ol, however. According to Ginterova, A., 1973, *Folia Mikrobiol.*, 18, 277–280, this is the reason why such products have not been very successful in the marketplace, e.g. when sold as "Morel Mushroom Flavoring" in the U.S.

SUMMARY OF THE INVENTION

Accordingly, the object of the present invention is to produce a mushroom aroma in mushroom cell masses with a high content of natural 1-octen-3-ol, starting with fermentatively cultured edible mushrooms.

This and other objects of the present invention which will become apparent from the following specification have been achieved by the present method of producing a mushroom aroma and a high content of 1-octen-3-ol in a mushroom cell mass, comprising the steps of:

fermentatively culturing a mushroom cell mass or a water suspension of a mushroom cell mass;

mechanically shear-treating the cell mass with a total energy input of 0.1–20 $kWh/m^3$; and concentrating the shear-treated cell mass.

DETAILED DESCRIPTION OF THE PREFERRED EMBODIMENTS

According to the invention, the mycelium of the cultured mushrooms, or a water suspension of said mycelium with 10–200 g/liter dry weight, is mechanically treated for 0.1–120 sec at 15°–40° C. under aerobic conditions, with a shearing action and total energy input rate of 0.1–20 $kWh/m^3$, and then the mycelium or the pressed juice recovered from the mycelium is concentrated by known methods and, if necessary or desirable, is converted to a stabile form.

Mushroom cell masses from, for example, the following species of edible mushrooms are used for the production of the mushroom aroma: *Morchella esculenta, Morchella crassa, Morchella hortensis, Morchella conica, Pleurotus ostreatus, Lentinus edodes, Corpinus comatus,* or *Agaricus bisporus*. In the context of the present invention, "edible mushrooms" are understood to be mushrooms which yield toxicologically unobjectionable aroma products under the conditions described.

The preferred edible mushrooms are mushrooms of the genus Morchella.

The cultured mushroom cell masses are recovered and then subjected to a shear-force treatment, which may be carried out in a batch or continuous operation.

If the energy input rate is less than 0.1 $kWh/m^3$, the shear action is insufficient; if greater than 20 $kWh/m^3$, excessive heating of the mushroom cell masses occurs. The preferred energy input rate is 1–10 kWh/m3.

If the dry weight concentration is less than 10 g/liter, there is an uneconomically large amount of water which must be evaporated after the mechanical treatment. If the dry weight concentration exceeds 200 g/liter, the resulting highly viscous slurry or thick paste is difficult to process.

If the mechanical treatment time is less than 0.1 sec, the "homogenization" effect is insufficient; if greater than 120 sec, there is excessive heating of the mass.

Suitable shear-force-generating dispersing devices for the treatment are, for example, stirring vessels with high-rpm cutter-type stirrer blades (e.g. cutter mills), stirrer devices with interpenetrating toothed wheels with narrow gaps in which the material being treated is conveyed vertically into the shear field (e.g., "Ultra-Turrax"), and devices with toothed wheels disposed on a horizontal shaft, which wheels have gaps whereby the product is subjected to high frequency shear and fluctuating pressure fields (e.g., "Supratron").

The mechanically treated edible mushroom mycelium can be dried directly and then ground to a mushroom powder. Ordinary drying apparatus is suitable for the drying, e.g. belt dryers, lattice dryers, lyophilizers, and spray dryers.

A pressed juice may also be obtained from the mushroom mycelium which has been shear-treated. This juice can then be dehydrated by ordinary methods to yield a mushroom extract (with extensive dehydration) or concentrate (with complete dehydration).

To improve shelf life, taste, pourability, or other desirable properties, various materials may be added, preferably prior to drying, which may include antioxidants (e.g. ascorbic acid), salts, excipients such as maltodextrin, etc.

The first stage of the fermentative culturing of the mushroom cell masses may be begun in an Erlenmeyer flask, by inoculating a nutrient solution with mushroom cells and then shaking the flask on a shaking machine. The mushroom cell masses obtained therefrom may then be used as inoculating material (an inoculating line) for a larger batch (2nd stage) which in turn comes to be used as the inoculating material for the actual culture of mushroom mycelium in a large fermentation vessel (stage 3) having working volume of, e.g., 100 m$^3$.

For multistage fermentation it is important that the inoculum for the next stage be finely divided and loose rather than in the form of compact pellets. It is therefore advantageous if at least one stage of the fermentative culturing is carried out in the presence of surface-active materials. Preferably, these surface-active materials are added in the first and second stages, or only in the first stage. In large fermentation vessels, it is often unnecessary to add surface-active materials.

The surface-active materials are preferably employed in concentrations of 0.02–1%, and particularly in concentrations of 0.05–0.5% based on the weight of the nutrient medium.

Suitable additives are preferably physiologically unobjectionable, natural (or derived from natural products) surface-active agents. Examples include mono- and diglycerides of saturated and unsaturated edible fatty acids, possibly with small amounts of alkali stearate; acetic acid esters, lactic acid esters, and citric acid esters, of mono- and diglycerides of edible fatty acids; diacetyltartaric acid esters of mono- and diglycerides of edible fatty acids; stearoyllactyl-2-lactate; and fat, oil, and fatty acid products, e.g. thistle oil, poppy seed oil, linseed oil, peanut oil, stearic acid, palmitic acid, and oleic acid ethyl ester.

The nutrient solution generally contains a carbon source (e.g. a sugar), a nitrogen source (e.g. an ammonium salt), an inorganic salt, and an agent supplying vitamins and trace elements (e.g. corn steep liquor).

Prior to the inoculation, the nutrient solution and the surface-active materials are sterilized, preferably by thermal means. This ensures that only cells of the inoculated mushrooms will be formed in the fermentation.

The fermentative culturing of edible mushrooms is an aerobic process, and therefore is carried out with an air supply. The temperature is generally 20°–40° C. The fermentation solution is neutral or slightly acid.

The addition of physiologically unobjectionable surface-active materials does not retard the fermentation. The mushroom cell masses are produced as finely divided masses or small loose flakes (or flocks), and can be used directly as inoculum for the next fermentation stage. It is unnecessary to break up solid mycelium pellets with the aid of a tissue homogenizer (see U.S. Pat. No. 2,276,246) to form a large number of crystallization nuclei.

The surface-active materials aid in simplifying the fermentation, because the incidence of cell mortality which would result from use of a tissue homogenizer is eliminated. Also, the hazard of contamination in an extra process step is eliminated.

The inventive method yields a mushroom aroma in the mushroom cell masses with natural 1-octen-3-ol in the amount of greater than 700 ppm. If the mushroom mycelium processed in the shear field is directly dried, one generally obtains mushroom products with 800–3000 ppm 1-octen-3-ol based on the dry weight.

If one first obtaines a pressed juice and prepares extracts or concentrates from this, 1-octen-3-ol contents of 1500–6000 ppm (dry weight basis) are obtained.

Other features of the invention will become apparent in the course of the following descriptions of exemplary embodiments which are given for illustration of the invention and are not intended to be limiting thereof.

EXAMPLES

EXAMPLE 1

Single-stage Fermentation:

7.8 liters of nutrient solution and 8 ml thistle oil were charged into a 12 liter fermenting vessel with blade stirrer and aeration apparatus. The composition of the nutrient solution was as follows (per liter of solution):

20 g glucose;
10 ml corn steep liquor;
2 g ammonium sulfate;
0.875 g $KH_2PO_4$;
0.125 g $K_2HPO_4$;
0.5 g $MgSO_4.7H_2O$
0.1 g NaCl
0.1 g $CaCl_2.2H_2O$
1 ml Trace substances solution.

The composition of the trace solution (per liter) was:

10 g $FeSO_4.7H_2O$;
1 g $MnSO_4.H_2O$
1 g $ZnSO_4.7H_2O$;
50 mg $CuSO_4.5H_2O$.

Sterilization was accomplished by heating to 121° C. and holding there for 45 min. Then 0.2 liter inoculum of the mushroom Morchella esculenta was added at 25° C.

Culture conditions:
(a) aeration: 0.5 vvm (liter air per liter reaction mixture volume per min);
(b) Rpm of stirrer: 300;
(c) Temperature: 25° C.;
(d) pH: 6.0 (maintained constant by adding ammonia water).

After 3 days fermentation, the culture brew contained mushroom mycelium with a dry weight concentration of 12 g/liter, in the form of small flakes. The mushroom mycelium was filtered out and washed with a small amount of water. The product was then mechanically treated 1 min at 25–30° C. with a cutter mill ("Multimix MX 32", supplied by Braun).

The thus treated mushroom mycelium was freeze dried and then pulverized.

Yield: 95 g mushroom product with 900 ppm 1-octen-3-ol.

EXAMPLE 2:

The procedure was as in Example 1, except that, after the mechanical treatment of the mushroom mycelium, pressed juice was produced with a hydraulic press at 50 bar. This juice was then freeze dried.

Yield: 30 g mushroom product with 2200 ppm 1-octen-3-ol.

Comparison Example A

The procedure was as in Example 1, except that after completion of the culturing the material was dried with no mechanical treatment.

Yield: 97 g mushroom product with 85 ppm 1-octen-3-ol.

EXAMPLE 3:

The procedure was as in Example 1, except that the edible mushroom Morchella crassa was employed, and 40 g poppy seed oil was used instead of thistle oil. After fermentation for 3 days, the mycelium had dry weight 11 g/liter.

Yield: 85 g mushroom product with 800 ppm 1-octen-3-ol.

EXAMPLE 4:

The procedure was as in Example 2, except that the edible mushroom Morchella hortensis was employed, and 40 g linseed oil was used instead of lhistle oil. After completion of the fermentation, the mycelium had dry weight 12 g/liter.

Yield: 25 g mushroom product with 2400 ppm 1-octen-3-ol.

EXAMPLES 5 TO 11

These examples illustrate that the growth of the edible mushroom mycelium is not retarded by addition of surface-active materials, but the product is obtained in a desirable loose form.

250 nutrient solution as per Example 12 was charged into a 2 liter flask. A surface-active material was added, sterilization was carried out, and then inoculation with 5 ml Morchella esculenta inoculum was performed. After incubating 4 days in a shaking machine at 27° C., the results summarized in Table 1 were obtained.

TABLE 1

| Example | Surface-active agent | Disperseness of mycelium | Dry weight |
|---|---|---|---|
| 5 | (none) | A small number of large pellets of mycelium | 2.4 g |
| 6 | 0.25 ml thistle oil | Numerous small flakes (or flocks) of mycelium | 2.5 g |
| 7 | 1.25 g poppy seed oil | Numerous small flakes (or flocks) of mycelium | 2.4 g |
| 8 | 1.25 g linseed oil | Numerous small flakes (or flocks) of mycelium | 2.6 g |
| 9 | 1.25 g oleic acid ethyl ester | Numerous small flakes (or flocks) of mycelium | 2.8 g |
| 10 | 1.25 g plamitic acid | Numerous small flakes (or flocks) of mycelium | 2.3 g |
| 11 | 0.25 g diacetyltartaric ester of mono- and di-glycerides of edible fatty acids (Datamuls ® 4820, supplied by Th. Goldschmidt, D-4300 Essen, FRG) | Numerous small flakes (or flocks) of mycelium | 2.5 g |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of producing a mushroom aroma and a high content of 1-octen-3-ol in a mushroom cell mass, comprising the steps of:
   fermentatively culturing a mushroom cell mass or a water suspension of a mushroom cell mass;
   mechanically shear-treating said cell mass with a total energy input of 0.1–20 kWh/m$^3$; and
   concentrating said shear-treated cell mass, wherein said concentrated cell mass contains greater than 700 ppm of 1-octen-3-ol relative to the concentrated cell mass.

2. The method of claim 1, wherein the energy input is 1–10 kWh/m$^3$.

3. The method of claim 1, wherein said mechanically shear-treating step is conducted at 15°–40° C. under aerobic conditions.

4. The method of claim 1, wherein said mechanically shear-treating step was conducted for 0.1–120 seconds.

5. The method of claim 1, wherein said water suspension has a cell mass concentration of 10–200 g/liter based on the dry weight of said cell mass.

6. The method of claim 1, wherein said mushroom cell mass comprises edible mushroom mycelium of the genus Morchella.

7. The method of claim 1, wherein said mechanically shear-treating is conducted with a shear-force-generating dispersing apparatus.

8. The method of claim 1, wherein said culturing step is conducted in at least one stage in the presence of a surface-active material.

9. The method of claim 8, wherein said fermentatively culturing step is carried out in the presence of a surface-active material.

10. The method of claim 8, wherein said surface-active material is present in a concentration of 0.02–1% based on the weight of said water suspension.

11. The method of claim 8, wherein said surface-active material is selected from the group consisting of natural oils, fats, fatty acids, and fatty acid esters.

12. The method of claim 10, wherein said surface active material is present at a concentration of 0.05–0.5% based on the weight of the water suspension.

13. The method of claim 11, wherein said surface-active material is thistle oil.

14. The method of claim 1, further comprising:
   adding antioxidants or excipients prior to said concentrating step.

* * * * *